Aug. 13, 1940.  N. S. McEWEN ET AL  2,211,604
AUTOMATIC PRESSURE CONTROL FOR FLATWORK IRONERS
Filed Jan. 31, 1938  2 Sheets-Sheet 1
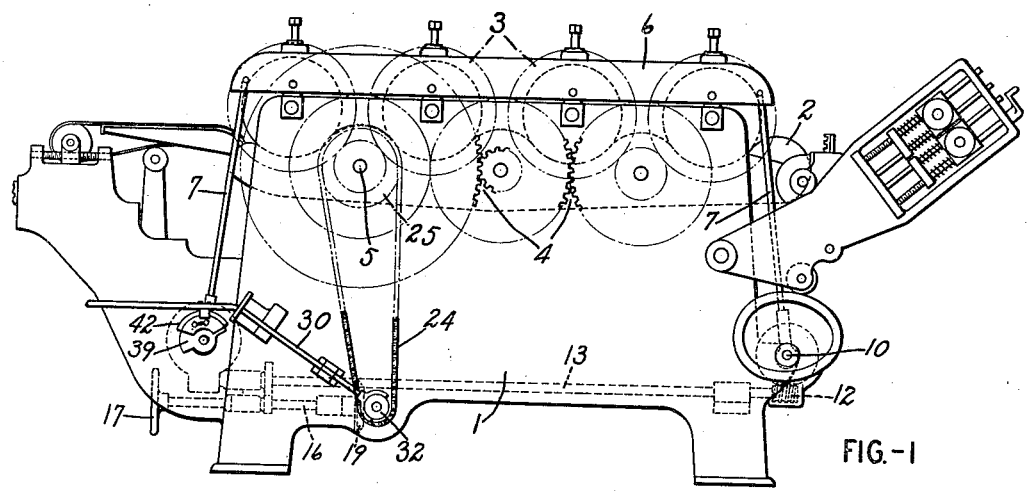
FIG.-1
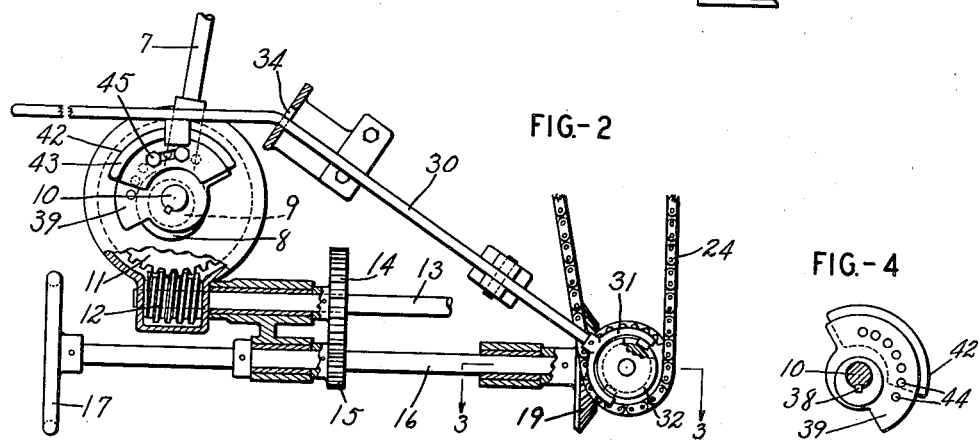
FIG.-2
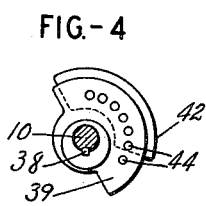
FIG.-4
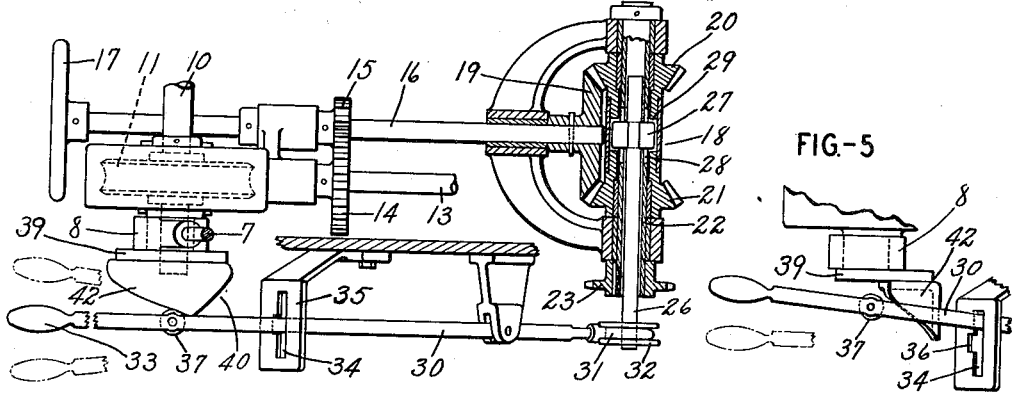
FIG.-3
FIG.-5
INVENTORS
NORMAN S. McEWEN
BY SHIRLEY C. WARD
Brockett, Hyde, Higley & Mayor
ATTORNEYS

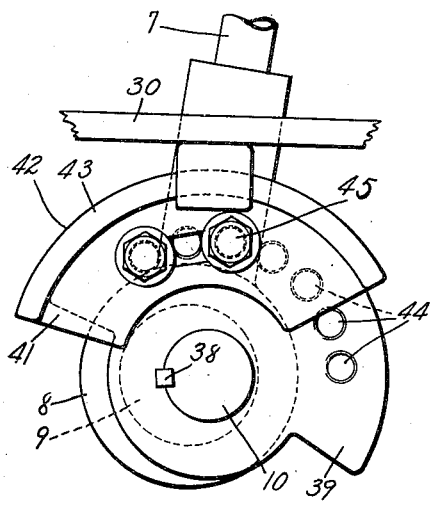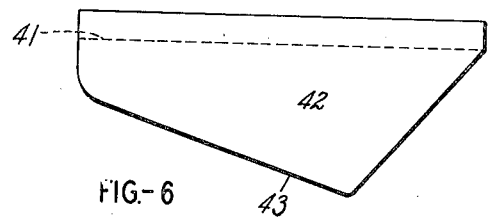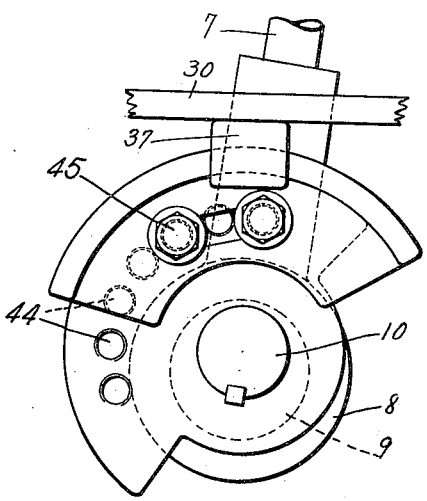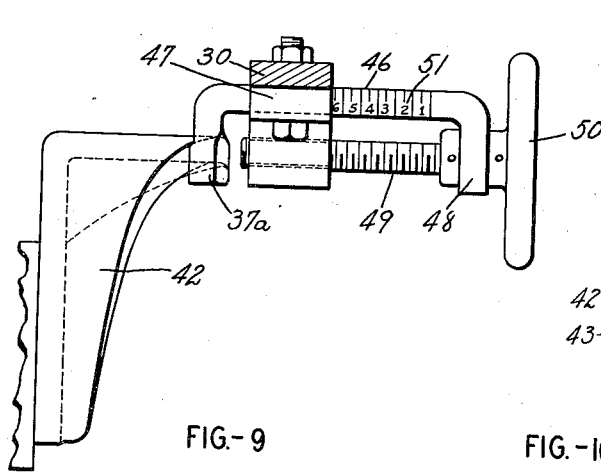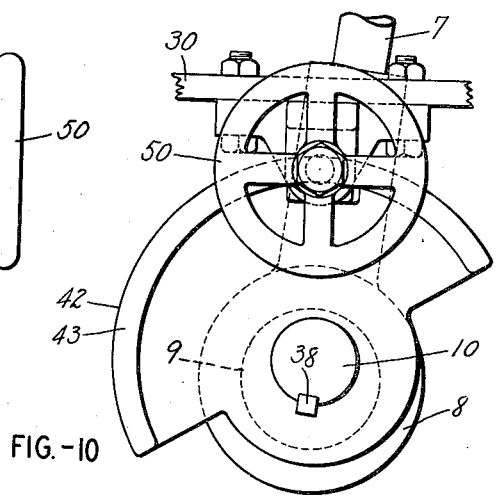

Patented Aug. 13, 1940

2,211,604

UNITED STATES PATENT OFFICE 2,211,604

AUTOMATIC PRESSURE CONTROL FOR FLATWORK IRONERS

Norman S. McEwen, Ridgetop, and Shirley C. Ward, Nashville, Tenn., assignors to The American Laundry Machinery Company, Norwood, Cincinnati, Ohio, a corporation of Ohio Application January 31, 1938, Serial No. 187,826

1 Claim. (Cl. 38—4)

This invention relates to ironing machines of the type in which the work is carried between a heated ironing member and a series of padded ironing rolls which are adjustable or movable into and out of ironing relation with said member. The invention has to do with the mechanism for so moving the rolls, which is designed for automatic control after it is set in operation by the operator.

One object of the invention is to provide improved roll adjusting mechanism of the character described in which the pressure applying and pressure releasing operations of the rolls are independent of each other in the sense that the first is automatically controlled while the second is operator controlled.

Another object of the invention is to provide roll operating mechanism capable of convenient adjustment to provide for automatic application of the rolls to the ironing member with any desired degree of pressure, not only for varying the desired pressure effect or to compensate for variations in padding conditions, but also in a manner to insure restoration of the same pressure conditions automatically whenever the rolls are closed against the ironing member for ironing service, all regardless of the will of the operator.

Another object is to provide an improved mechanism of this kind in which the roll adjusting mechanism is operated by clutch actuated reversing devices having a controlling lever which is automatically returned to neutral or inoperative position by a cam timed with relation to and operated by the roll adjusting parts so as to terminate the pressure applying operation with the particular pressure for which the mechanism is set, and which mechanism is capable of adjustment to secure any desired pressure or, in case of variations in the padding conditions, to always enable the same pressure to be obtained, by proper adjustment of the parts.

Further objects of the invention are in part obvious and in part will appear more in detail hereinafter.

In the drawings, Fig. 1 is a side elevation, partly diagrammatic, of one form of ironing machine embodying the invention; Fig. 2 is an enlarged elevation, partly broken out and in section, of a portion of the mechanism shown in Fig. 1; Fig. 3 is a plan view, partly in section on the line 3—3, Fig. 2, and showing the same parts; Fig. 4 is a detail view of a cam device illustrated in Fig. 2, but looking at the opposite face thereof; Fig. 5 is a detail view showing some of the parts illustrated in Fig. 3, but in another position; Fig. 6 illustrates a development of the controlling cam; Fig. 7 is an enlarged detail elevation, corresponding to Fig. 2, of the controlling cam, showing the same adjusted to minimum pressure position; Fig. 8 is a similar view, showing the cam adjusted to maximum pressure position; Fig. 9 is a detail elevation, showing a modified form of mechanism embodying the invention; and Fig. 10 is an elevation from the right in Fig. 9.

While the invention may be applied to any form of ironing machine in which a padded roll or rolls is applied to an ironing member for producing the ironing effect, such as one where the ironing member is a large heated smooth surfaced roll, for convenience and in no sense of limitation the invention has been shown applied to a machine of the roll and chest type. That is to say, the machine shown comprises a suitable frame 1 supporting a hollow heated grooved ironing member or chest 2, the concavities of which are designed to receive the several padded rolls 3 all driven in the usual manner by gearing marked generally 4 and including a main shaft 5. The rolls are moved into and out of the pressure applying position shown by the usual vertically movable pressure bars 6 by which they may be lifted out of the concavities of the chest to remove their padded surfaces from contact with the heated surfaces, or may be lowered into contact therewith so as to apply the desirable degree of pressure for the ironing operation.

Pressure bars 6 are operated by lifting rods 7 pivoted to them, said rods at their lower ends having straps 8 embracing eccentrics 9 on cross shafts 10 each provided with a worm gear 11 driven by a worm 12 on a longitudinally extending shaft 13 driven by gears 14, 15 from a shaft 16. Said shaft at one end is provided with a hand wheel 17 for hand operation or adjustment of the parts when necessary or desirable, and at its opposite end with connections to a suitable clutch controlled reversing mechanism, such as the usual form indicated generally at 18, Fig. 3. This mechanism, briefly described, comprises a bevelled driven pinion 19 fast on shaft 16 and coupled to two opposite axially alined loose bevel pinions 20, 21 journalled on a hollow shaft 22 provided with driving connections, such as the sprocket 23 connected by chain 24 to a sprocket 25 on main shaft 5. Within the hollow shaft 22 is slidable a rod 26 having a clutch member 27 extending outwardly through elongated slots 28 in the shaft and designed to be engaged selectively with clutch teeth 29 on the inner ends of the two loose pinions 20, 21, to rotatively drive the shaft 16 in one direction or the other according to which pinion 20, 21 becomes the active driving member. Rod 26 is shifted back and forth, longitudinally, to produce drive in one direction or the other by a pivoted lever 30 provided at one end with a fork 31 engaging a grooved collar 32 on the rod, and at its other end with a handle 33. Intermediate its ends lever 30 passes through a slot 34 in a fixed bracket 35, said slot having a neutral recess 36, and said lever also has or carries a part, such as roller 37, forming an abutment for cooperation with a cam device, as will appear. Lever 30 normally occupies a position in the neutral recess 36, but is sufficiently flexible (or its pivoted mounting is sufficiently sloppy or loose) so that it readily may be lifted out of said recess for movement toward either end of slot 34, as in Fig. 5.

To automatically operate the clutch in the manner to be described, the present invention provides cam means operated by a part of the roll adjusting mechanism, such as shaft 10, and effective upon lever 30, as at its abutment 37. Of course, the several eccentrics 9 are all fixed to the shafts 10, as by keys 38, Fig. 7, so that they are relatively timed and in step with each other, as will be readily understood. In the arrangement shown, one of said eccentrics is provided with a disc or plate 39, preferably integral therewith so as to be definitely set or timed with reference to its eccentricity. Said plate serves as the support for a cam member 40 having a wall 41 and a curved and partly cylindriform cam flange 42, the end edge 43 of which has the cam contour shown in Fig. 6 and lies opposite abutment roller 37 (Fig. 3).

Figs. 1, 2 and 3 show the parts in the positions occupied when the ironing machine is in use, the rolls being applied to the chest with the particular degree of pressure for which the mechanism is set. Assuming that it is desired to stop the machine, as at lunch or at the end of the day, it is of course essential to remove the rolls from contact with the chest to avoid scorching the padding. The operator therefore grasps the handle 33, raises lever 30 out of notch 36, and moves it to the right (downward in Fig. 3), to the end of slot 34. This couples gear 20 to shaft 22 and the shaft 16 is driven in the proper direction to cause the several eccentrics 9 to raise rods 7 and pressure bars 6 and elevate the rolls. When the rolls are sufficiently elevated to remove them from contact with the chest the operator returns lever 30 to its neutral position in recess 36, thereby opening the clutch and disconnecting the drive. Rotation of shafts 10 to raise the rolls turns cam 42 from the position shown in Fig. 3 to that shown in Fig. 5, although it should be understood that the latter view does not show the limiting position to which the parts may go if the operator deems it necessary.

In the new idle position of the parts, abutment roller 37 is now opposite or beyond the low part of the lobe of cam 42. Consequently lever 30 now may be shifted in the opposite direction, or to the left (upward in Fig. 3). By such operation of the lever the other pinion 21 is coupled and shaft 16 is driven in the opposite direction, reversing the former direction of rotation of shafts 10. As the operation proceeds the edge of cam 42 engages the roller 37 and gradually moves over the lever 30 until it finally reaches neutral position where it drops in to recess 36. As it reaches this position the clutch is disconnected or opened and the roll adjusting operation ceases with the rolls applied to the chest with that degree of pressure for which the mechanism has been set, the entire control, after the operator has pushed lever 30 over, being automatic and independent of effort or judgment by the operator. Consequently the machine is always closed or set into operation with the rolls in the same position relative to the chest, so that except for variations in the padding conditions, the machine always produces the same degree of pressure.

To enable the degree of pressure to be varied according to variations in the work being operated upon or for other reasons, or to adjust the degree of pressure in accordance with variations in padding conditions of the rolls, as when the padding packs down or is renewed, the present invention provides means for adjusting the relation between the clutch mechanism and that part of the roll adjusting mechanism which is used to operate the clutch, such as shaft 10 in the form shown. The adjustment for this purpose may be inserted at any point in the chain of operating connections between shaft 10 and the clutch and may take various forms. The drawings illustrate two forms, although others are contemplated within the scope of the claim appended hereto.

In the form shown in Figs. 1 to 8 inclusive, the adjustment is between the cam 42 and its driver, the eccentric 9. Here plate 39 and wall 41 are each provided with circumferential slots or a series of holes 44 (the latter arrangement being shown) to receive securing bolts 45. By circumferential adjustment of the cam 42 around the axis of shaft 10 and insertion of the bolts through the desired pairs of holes in members 41 and 39 the angular relationship of the cam 42 to shaft 10 may be varied with the result of causing the operation of applying the rolls to the chest to terminate sooner or later, as desired. Fig. 7 illustrates the parts assembled in a manner to produce minimum application of the rolls to the chest, while Fig. 8 shows the arrangement for maximum application.

Figs. 9 and 10 show another arrangement in which the adjustment is between the lever 30 and the abutment which it carries to receive the push or thrust of cam 42. Here cam 42 is fixed with reference to eccentric 9 and there is no adjustment between them, such as in Figs. 7 and 8. The abutment, here marked 37a, is a block formed by an offset portion of a bar 46 slidable crosswise of lever 30 in a guide 47 and provided with an arm 48 in which rotates an adjusting screw 49 having a handle 50 and threaded into a portion of guide 47. By turning the screw the abutment 37a may be moved right or left in Fig. 9, with the effect of terminating the roll adjusting operation later or sooner, as before. 51 indicates a convenient gauge for indicating the degree of adjustment or even the existing pressure conditions, according to method of calibration.

With all forms of the invention the matter of determining the existing pressure conditions when the machine is in operation is taken away from the machine operator and may be left to the care of an experienced mechanic whose duty it is to see to proper adjustment of the parts. The unskilled machine operator need only operate lever 30 without judgment as to degree of pressure. Also, the machine operator is unable to produce undesirable heavy pressure such as might harm the work or injure or scorch the padding. Other advantages of the invention will be apparent to those skilled in the art.

One advantage of the invention is the simplicity and ease with which it may be adapted to machines already in use in which clutch control is entirely mechanical. Such machines are usually equipped with four of the eccentrics 9, by removing one of which and substituting for it the eccentric 9 show herein, with the cam 42 adjustable with relation thereto, and in appropriate relation with lever 30, the machine is readily made semi-automatic, with the opportunity to time completion of roll advance movement by proper adjustment of the cam 42.

What we claim is:

In apparatus of the character described having a chest and a cooperating roll adjustable toward and from the chest, the combination of roll adjusting mechanism, comprising a clutch operated reversible driving shaft having an eccentric for adjusting the roll, a cam operated by said shaft and mounted upon and rotatably adjustable upon said eccentric around the shaft axis, a clutch operating lever having a neutral position and movable selectively to either of two clutch coupling positions, in one of which said lever meets said cam and the roll is advanced and in the other of which the roll is retracted, said cam having its active part extending peripherally of the shaft and being adapted upon rotation of said shaft to return the lever to neutral position when roll adjustment movement is completed, and being also adapted by rotatable adjustment upon said eccentric to vary the time of completion of lever return movement.

NORMAN S. McEWEN.
SHIRLEY C. WARD.